(12) United States Patent
Bonner et al.

(10) Patent No.: US 8,400,089 B2
(45) Date of Patent: Mar. 19, 2013

(54) CONTROL ELECTRONICS FOR BRUSHLESS MOTORS

(75) Inventors: David Bonner, Bethlehem, PA (US); Aidong Xu, Cambridge (GB)

(73) Assignee: Thor Power Corporation, Allentown, PA (US)

(*) Notice: Subject to any disclaimer, the term of this patent is extended or adjusted under 35 U.S.C. 154(b) by 174 days.

(21) Appl. No.: 12/778,031

(22) Filed: May 11, 2010

(65) Prior Publication Data

US 2011/0033173 A1 Feb. 10, 2011

Related U.S. Application Data (63) Continuation of application No. 11/469,023, filed on Aug. 31, 2006, now Pat. No. 7,715,698.

(60) Provisional application No. 60/712,945, filed on Aug. 31, 2005, provisional application No. 60/725,775, filed on Oct. 11, 2005.

(51) Int. Cl.
*H02P 7/00* (2006.01)

(52) U.S. Cl. ............... 318/432; 318/700; 318/807

(58) Field of Classification Search ............... 318/432, 318/700, 809, 811, 799, 801, 439, 802, 721
See application file for complete search history.

(56) References Cited

U.S. PATENT DOCUMENTS

| | | | | |
|---|---|---|---|---|
| 5,157,665 A * | 10/1992 | Fakhraie-Fard et al. | ...... | 714/712 |
| 6,362,586 B1 * | 3/2002 | Naidu | ............ | 318/432 |
| 6,850,426 B2 | 2/2005 | Kojori et al. | ............ | 363/123 |
| 6,906,503 B2 | 6/2005 | Lopez-Santillana et al. | . | 323/283 |
| 7,659,678 B2 | 2/2010 | Maiocchi | ........... | 318/400.22 |
| 2003/0057907 A1 * | 3/2003 | Shibuya et al. | ........... | 318/439 |

* cited by examiner

*Primary Examiner* — Karen Masih
(74) *Attorney, Agent, or Firm* — Robert M. Bauer (57) ABSTRACT

An electronic control circuit for a brushless motor has an input power circuit providing a DC voltage and a microcontroller integrated circuit receiving the DC voltage. The microcontroller integrated circuit provides three-phase control signals according to a space vector control method. A microprocessor connected to the microcontroller integrated circuit executes supervisory control over the electronic control circuit. An inverter circuit receives the three-phase control signals from the microcontroller integrated circuit and provides driving signals to the brushless motor based on the three-phase control signals received from the microcontroller integrated circuit.

5 Claims, 14 Drawing Sheets

CONTROL ELECTRONICS FOR BRUSHLESS MOTORS

RELATED APPLICATIONS

This application claims priority to U.S. patent application Ser. No. 11/469,023 filed on Aug. 31, 2006 now U.S. Pat. No. 7,715,698, which in turned claimed priority to U.S. Provisional Patent Application Ser. No. 60/712,945 filed on Aug. 31, 2005 and U.S. Provisional Patent Application Ser. No. 60/725,775 filed on Oct. 11, 2005. The contents of all of these parent patent applications are hereby incorporated by reference in their entirety.

FIELD OF THE INVENTION

The invention relates generally to control electronics for brushless motors. In particular, the invention relates to the application of one or more microcontrollers to control a brushless motor.

BACKGROUND OF THE INVENTION

The US Department of Energy has estimated that alternating current motors consume more than 65% of the electricity produced and total electricity sales in the US will increase at an average annual rate of 1.9%, from 3,481 billion kilowatt hours in 2001 to 5,220 billion kilowatt hours in 2025. With a reduction in electrical energy consumption by 33%, by today's measure, is equivalent to the total output of 840 fossil fuel-based power plants. Throughout the world, electricity is used at an average rate of 40 billion kilowatt-hours each day, with a projected average annual growth rate of 2.3% for the next 20 years.

With few exceptions, much of the electricity is not used in the form in which it was initially produced. Rather, it is reprocessed to provide the type of power needed in the technology that is being employed. Power electronics process and convert electrical power from one form to another. It is expected that up to 80% of electrical power will be processed by power electronics equipment and systems.

In conventional control of a brushless motor, it is critical to know the rotor position. One known method is to fit Hall Effect Sensors inside the motor to detect the rotor position. This control method has the disadvantage of fitting the hall sensors (including components and assembly costs).

Sensorless control methods do not have this disadvantage. There are at least two different types of sensorless control methods: 1) detecting the back-emf zero crossing; and 2) space vector control (or field oriented control). The space vector control method consists of controlling the components of the motor stator currents, represented by a vector, in a rotating reference frame d,q aligned with the rotor flux. It requires the dynamic model equations of the motor and returns the instantaneous currents and voltages in order to calculate and control the variables. So-called Clarke and Park transformation will take place to translate the stator variables (currents and angle) into a flux model. This flux model is compared with the reference values and updated by a PI controller. After a back transformation from field to stator coordinates, the output voltage will be impressed to the motor with Pulse Width Modulation (PWM).

BRIEF SUMMARY

The preferred embodiments of the invention provide improved electric efficiency compared to conventional control electronics for brushless motors. The applications of brushless motors include air conditioners, refrigerators, power tools, washers, and dryers, and industrial power tools, such as angle grinders, to name a few. The preferred embodiments use one or more microcontrollers, which may be combined with other highly efficient components, to electronically control a brushless motor.

Some motor control electronics accept all major international voltages, eliminating the need for having different control electronics and motors for many different countries. These embodiments may be applied to motor systems up to 5 kilowatts, but have particular application to the 1 to 2 kilowatt power range.

The control electronics according to the preferred embodiments adapt a controller IC to the challenging high power, high speed, and high performance motor application. While the controller IC may have many control functions built-in, design customization in software sets the application specific control parameters and, through both power electronics hardware and the control algorithm development, is able to efficiently achieve, for example, a maximum 30,000 rpm motor speed at 2 kW load and up to 4 kW overload capability.

Soft start is implemented to allow the motor smooth start-up and a vector control method is implemented so that the motor has much smooth torque profile. Other aspects include comprehensive control software for motor specific applications: e.g. motor start-up; under various load conditions; overload capability and protection and thermal protection—all these are achieved with a very low cost PIC processor.

DETAILED DESCRIPTION OF THE PREFERRED EMBODIMENTS

Figure 1:
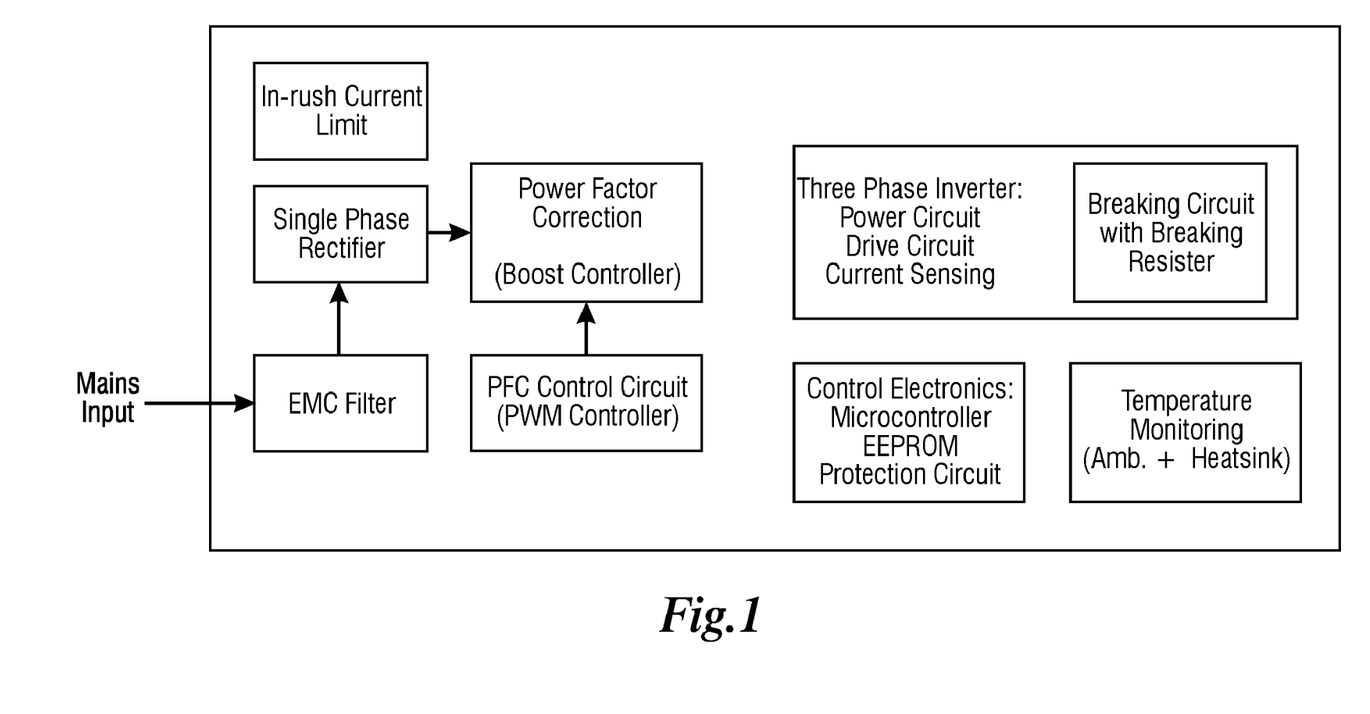
FIG. 1 is a block diagram of the control electronics in which the preferred embodiments of the invention may be utilized.

The invention encompasses several preferred embodiments of control electronics for brushless motors. The major building blocks of one preferred embodiment of the control electronics are shown in FIG. 1 and described below and in the parent patent applications that are incorporated herein by reference in their entirety.

Figure 2:
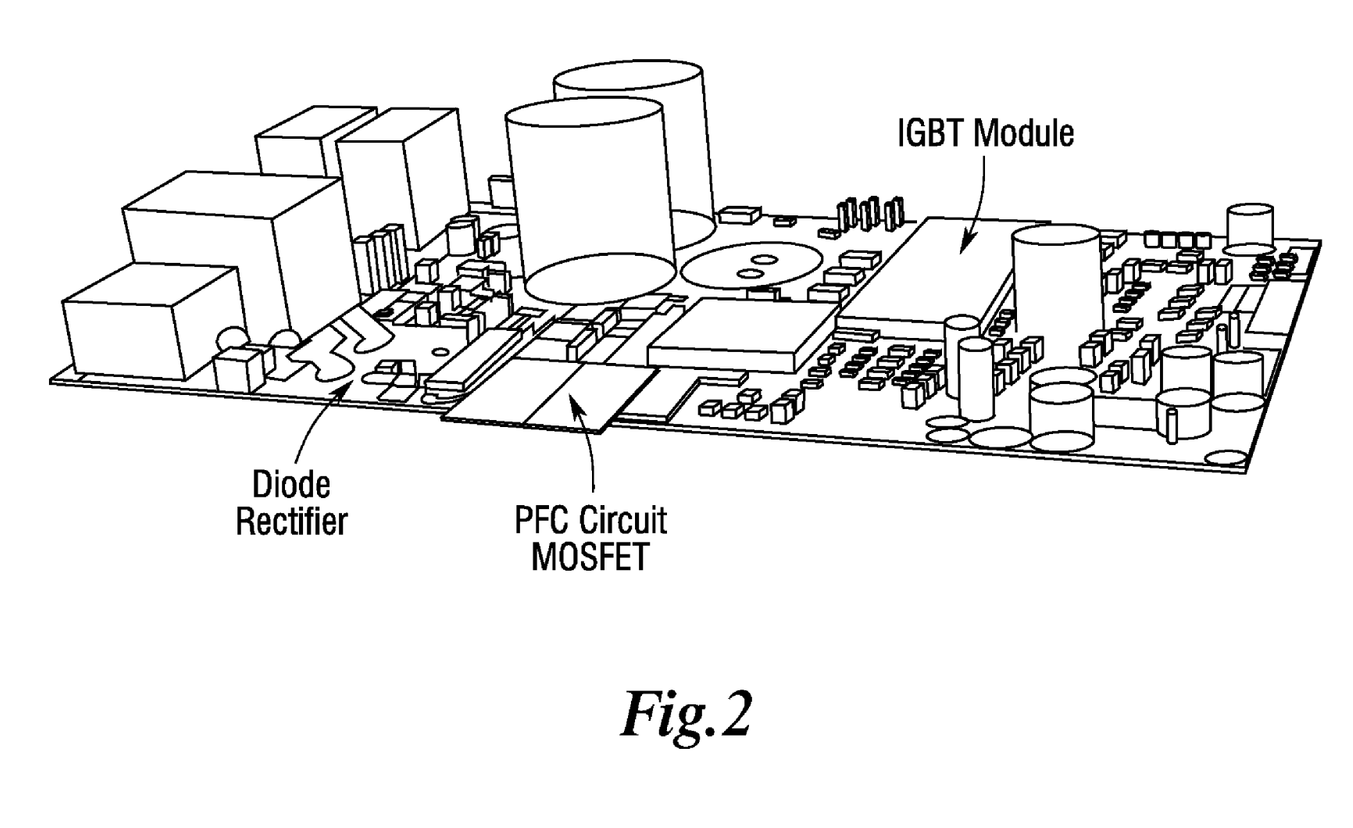
FIG. 2 is a perspective view of a preferred implementation of the motor control electronics in FIG. 1.
Figure 3:
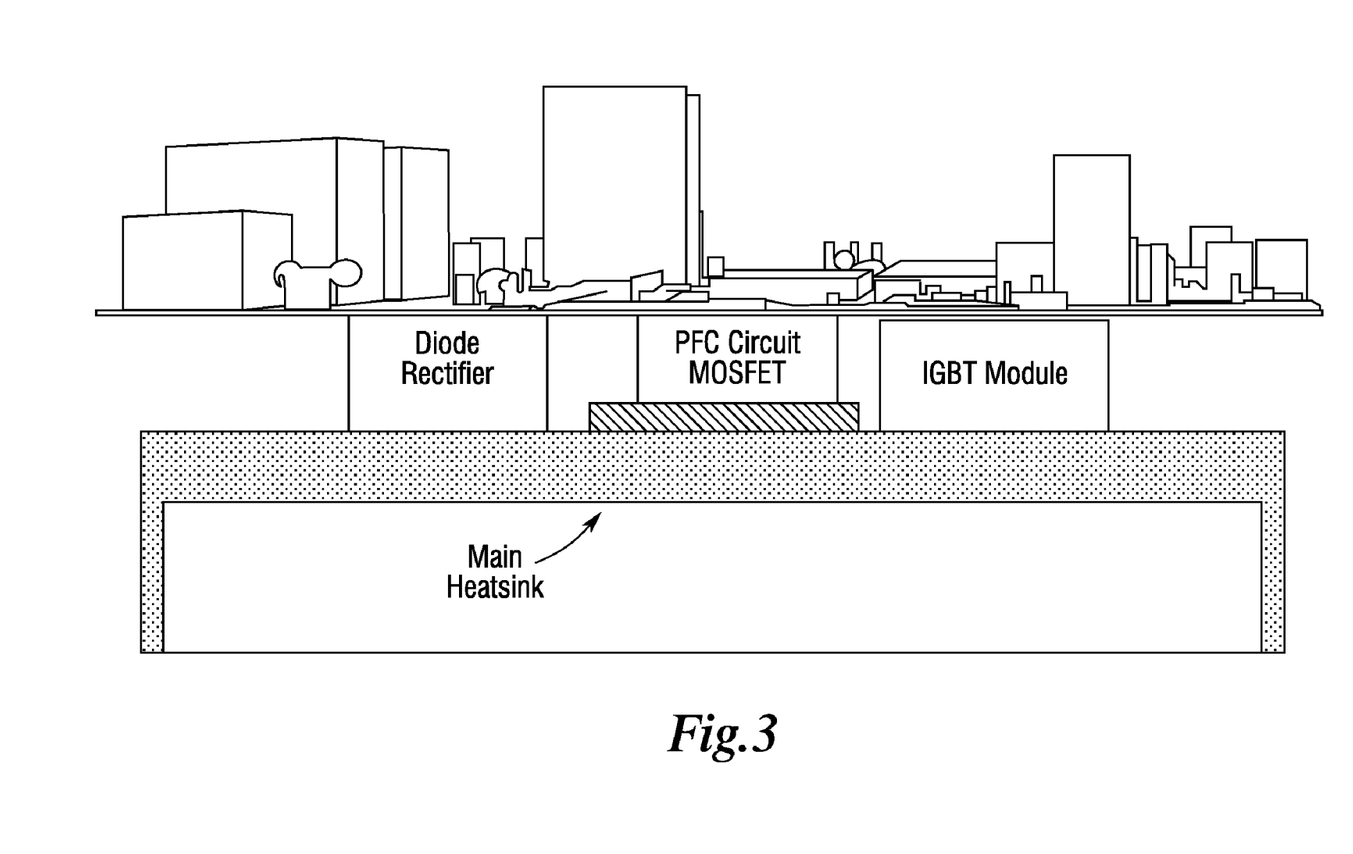
FIG. 3 is a side view of the preferred implementation of the motor control electronics in FIG. 1, diagrammatically illustrating the connection of parts to a main heatsink.

A very high power density is achieved by configuring all of the control electronics on a single printed circuit board. Optimally, the electronics are separated and divided into two parts. On the left side, there is input power control circuitry connected by a DC link to control circuitry and power output circuitry on the right side. A perspective view of an example layout implementation is shown in FIG. 2. The diode rectifier module, PFC Circuit MOSFET elements, and IGBT module dissipate the most amount of heat and the approximate location of these parts are shown in FIGS. 2 and 3. These parts are preferably located on the bottom side of the printed circuit board, while other components which have only a few watts loss are located on the other side of the printed circuit board. The heat from the low wattage components are dissipated through the air while the three main parts are preferably connected to a heatsink. The diode rectifier module and the IGBT module are directly connected to a main heatsink, whereas the MOSFET elements are mounted to a small heatsink via insulated pads, and then attached to the main heatsink as shown in FIG. 3.

In addition, the ambient temperature and power device (heatsink) temperature may also be monitored. In the event of device over-temperature, the drive is shut down, the inverter output will be disabled and the motor will coast to a stop. The drive may include a signal interface with a motor thermal trip mechanism (may be a thermistor). If motor over temperature trip signal is received, the drive output stage can be disabled. A trip latching mechanism may be included so that when the drive has tripped (due to over temperature or other fault), it will not start again until after the operator presses an On/Off trigger from the ON position to OFF and back to ON again. Short or open circuits in the trigger wiring are also monitored and will deactivate the drive circuit.

While the control electronics have a power rating of about 2 kilowatts, with overload capability, and work with both European (230V AC) and American (110V AC) supply voltages, they may be applied or adapted for motors up to about 5 kilowatts or with different supply voltage capabilities.

The input power control circuitry receives the main input and includes an EMC filter, and a single phase rectifier with in-rush current limiter. The input power control circuitry may or may not include the electronics disclosed in U.S. Pat. No. 7,088,066 issued on Aug. 8, 2006, which patent is hereby incorporated by reference in its entirety. The input power control circuitry also includes a power factor correction (PFC) circuit (which may include a boost converter), and a PFC control circuit, such as a PWM controller.

The EMC filter may be a common mode and differential mode EMC filter as shown in FIG. 3. The rectifier may be an input diode rectifier bridge used to convert single phase AC to DC. An IR GBPC3512W bridge rectifier (about 0.9V×2), or other rectifiers with a below average forward voltage drop, may be used.

The PFC circuit serves two main purposes: power factor correction and step up supply voltage. To limit the current and voltage phase-displacement introduced to the single phase main power supply, the power factor requirement is preferably 0.98 for the entire range of loads at both 110V AC and 230V AC. The maximum end of the load range is full load and the minimum end of the load range is experienced when the motor driven by the electronics is free running and may be about 20%.

For the inductor in the PFC circuit, the Coolu core is preferably used. As a power switching device, a STW45NM50FD may be used (two in parallel) for their low Rdson (0.08 ohm). Two in parallel will yield 0.04 ohms resistance. A NCP1650-D (On Semiconductor) is preferably used as the power factor controller, but the UC3845 (or newer 3817A) may also be used.

The control electronics implement a new space vector control method. In this method, the controllability of the motor torque closely matches the load requirement and may be less effected by back-emf noise. It is also likely that the motor will have less vibrations, less torque ripple and better efficiency. This method may be implemented using software algorithms and a Digital Signal Processor (DSP) to carry out complex vector calculation.

The circuit diagrams for the preferred embodiment of the control electronics are illustrated in FIGS. 8-12. A list of the referenced parts is provided in Provisional Patent Application No. 60/725,725 filed on Oct. 11, 2005 and incorporated herein by reference. Where specifics are provided, such as the identification of suitable parts, such specifics are illustrative and exemplary, and need not be utilized in a particular preferred embodiment.

The exemplary control electronics design shown in FIGS. 8-12 adapts the PM motor IC control module IRMCK203 available from International Rectifier with an external microcontroller. The IRMCK203 is designed for complete closed loop current and velocity control of a high performance sensorless drive for PM motors, and provides the basis for the space vector control of the motor. It has many internal registers and an external microcontroller may be programmed to dynamically control parameters of vector control algorithms embedded in the device. It also monitors low level fault conditions, such as over/under voltage of the DC bus, loss of motor phase, improper startup, or over-current.

Figure 4:
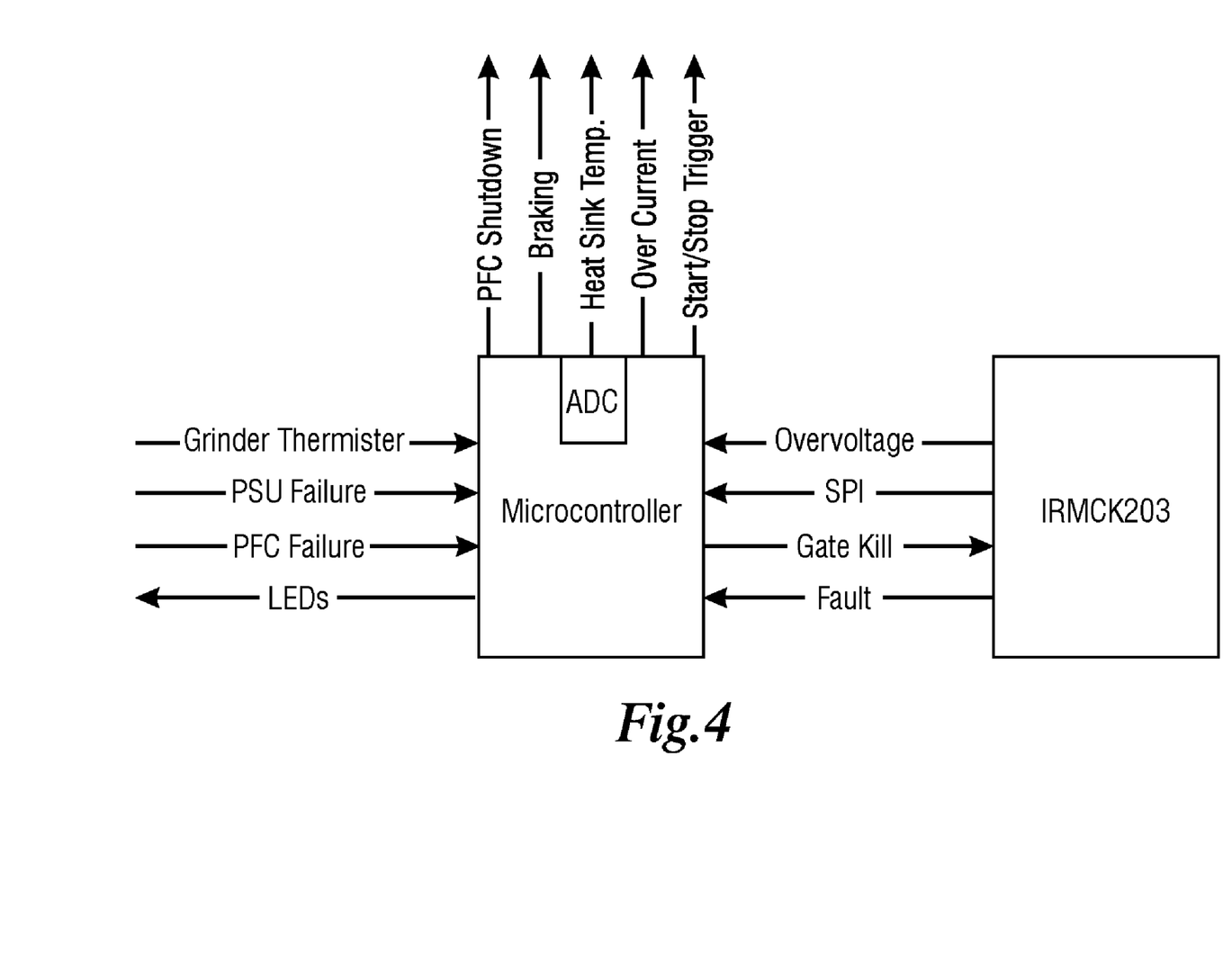
FIG. 4 is a diagram of the microcontroller connections in the motor control electronics of FIG. 1.
Figure 5:
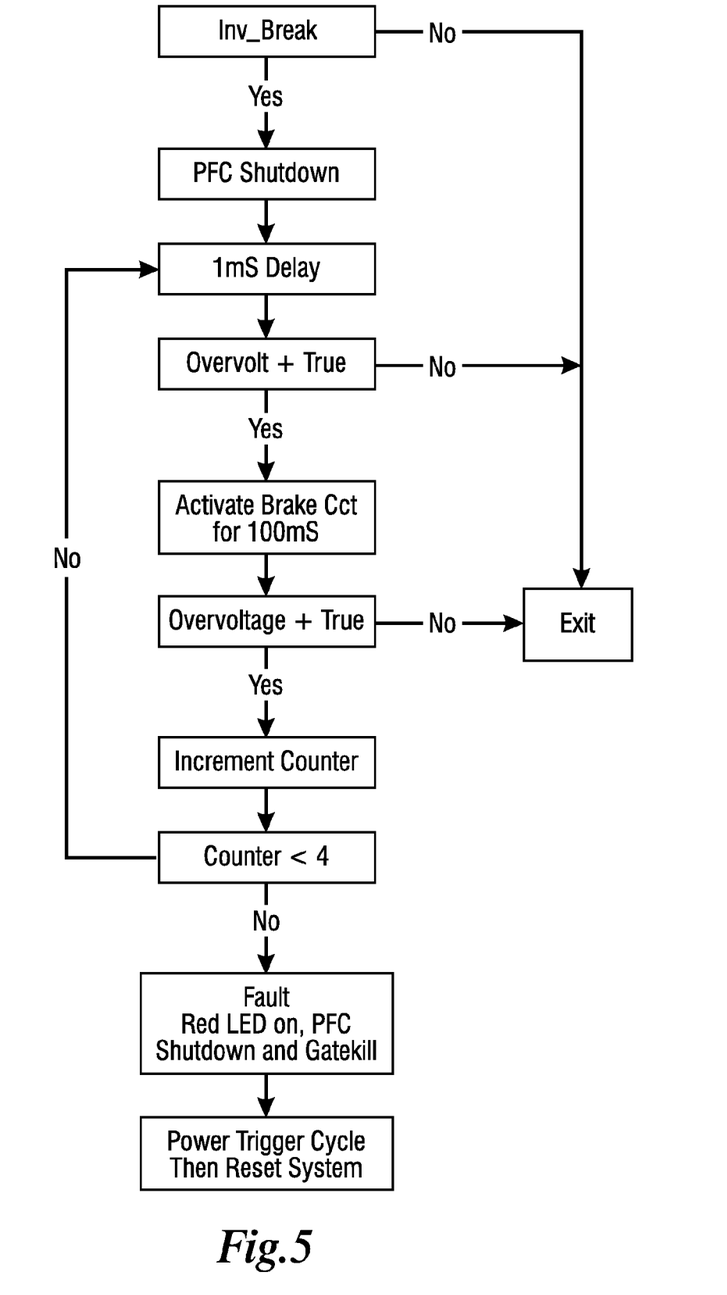
FIGS. 5-7 are flowcharts showing the process implemented by the microcontroller in the motor control electronics of FIG. 1.
Figure 6:
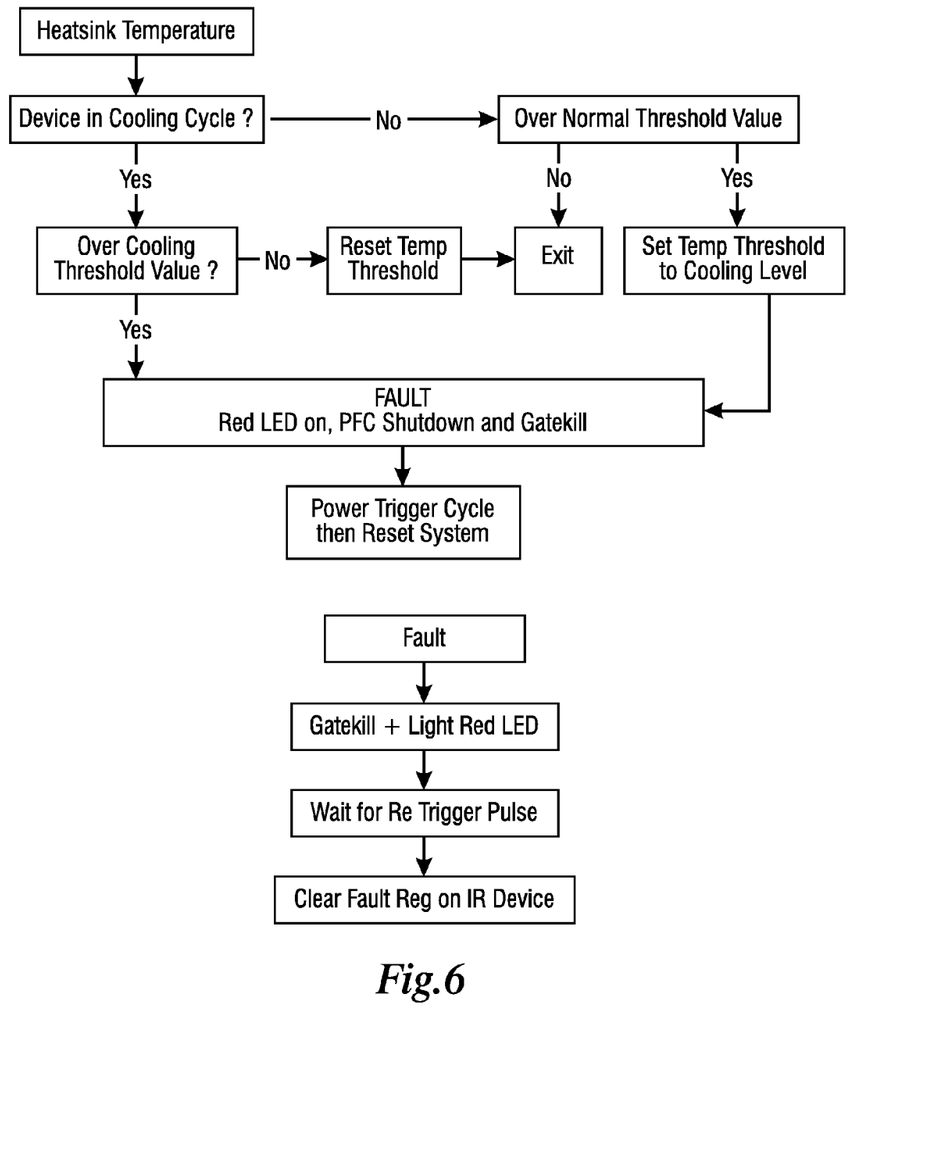
Figure 7:
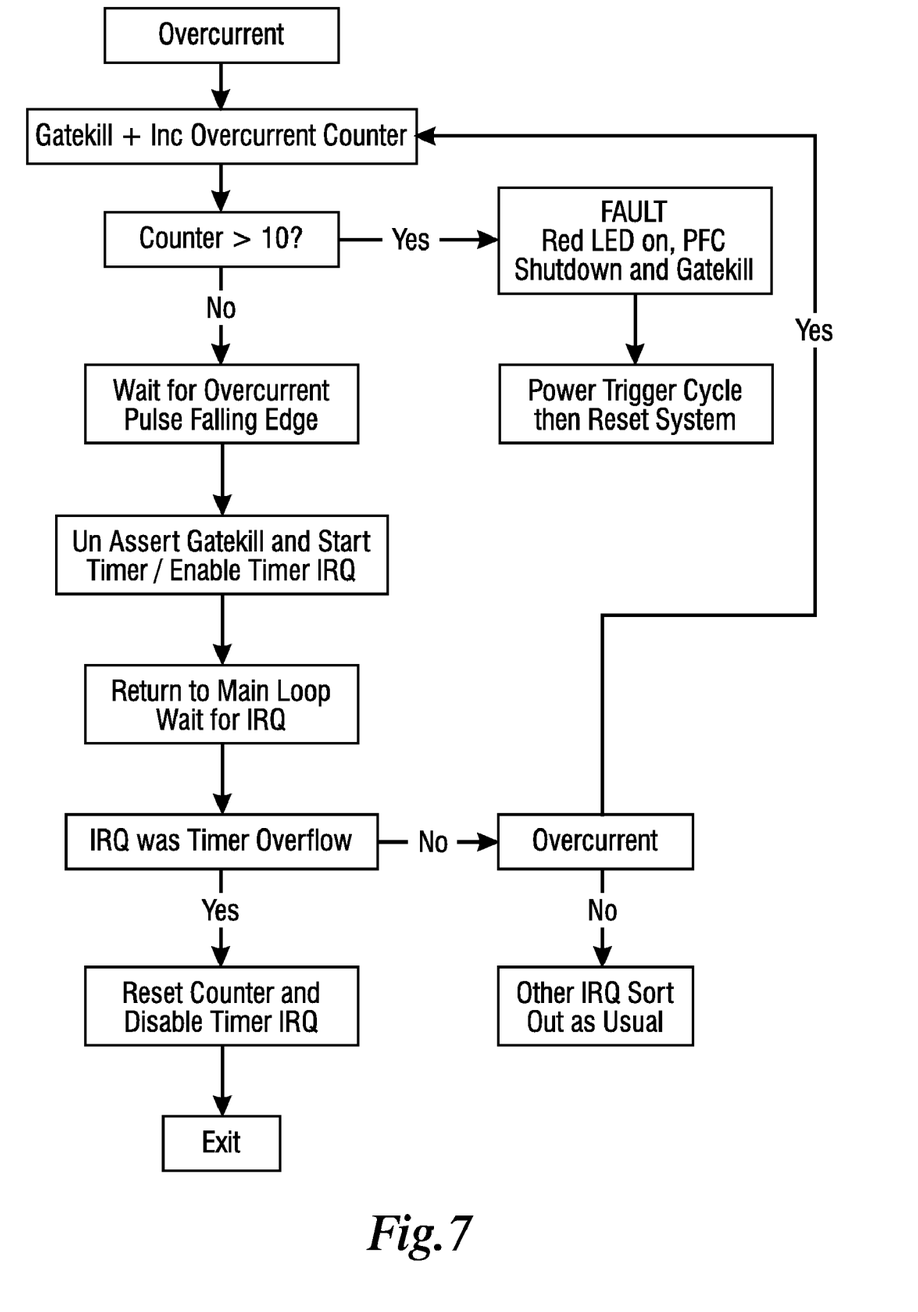
Figure 8:
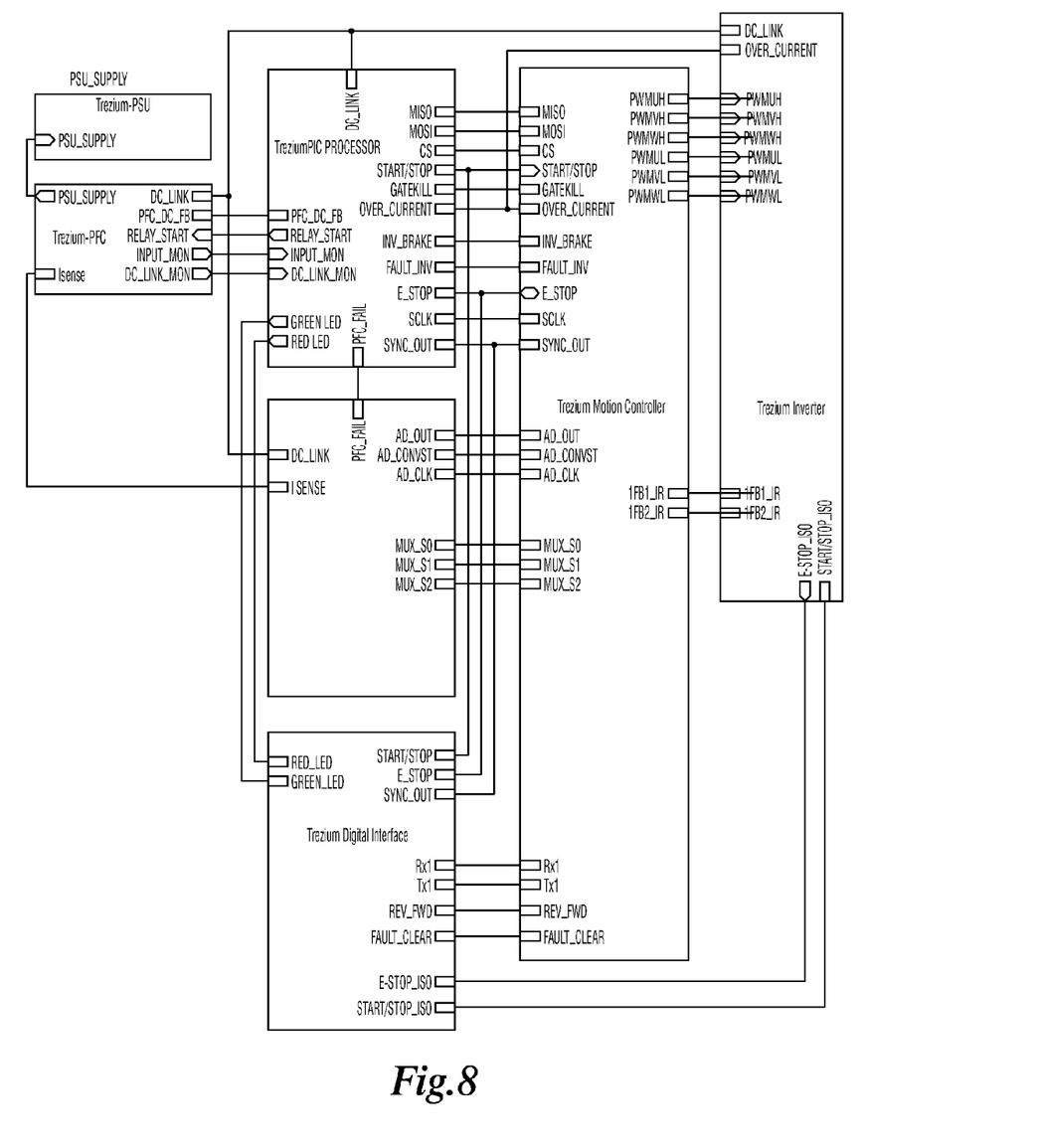
FIG. 8 is a circuit diagram of the motor control electronics including a preferred embodiment of the invention.
Figure 9A:
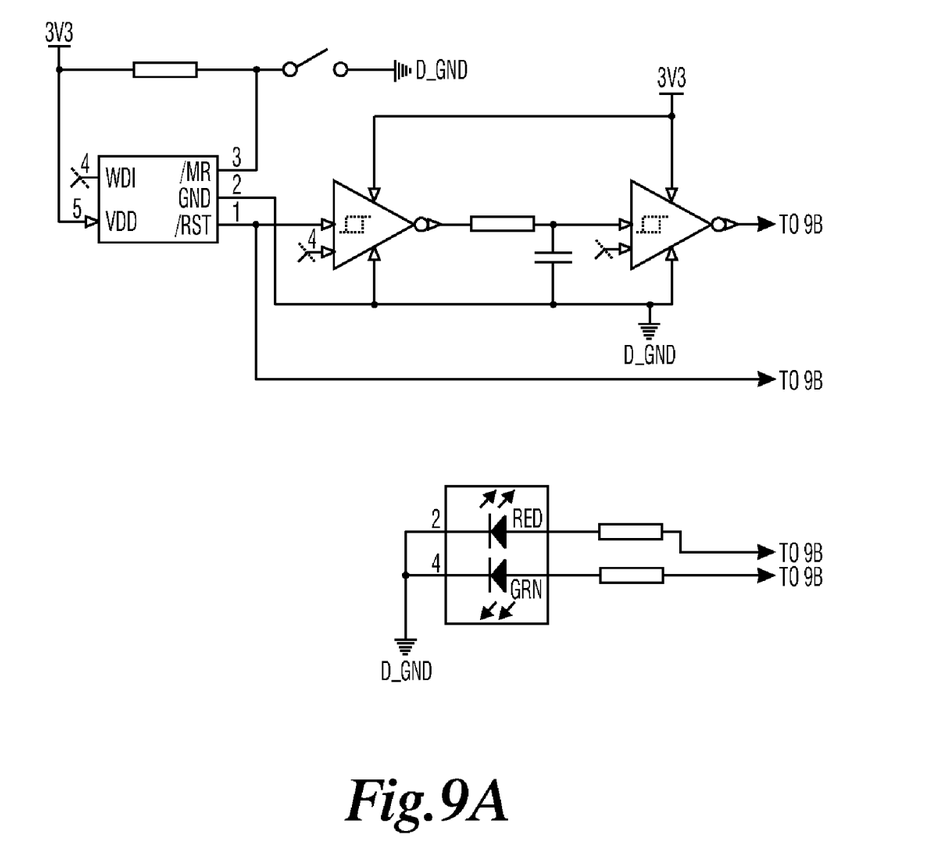
FIG. 9 is a circuit diagram of the motion controller circuitry in the preferred embodiment of FIG. 8.
Figure 9B:
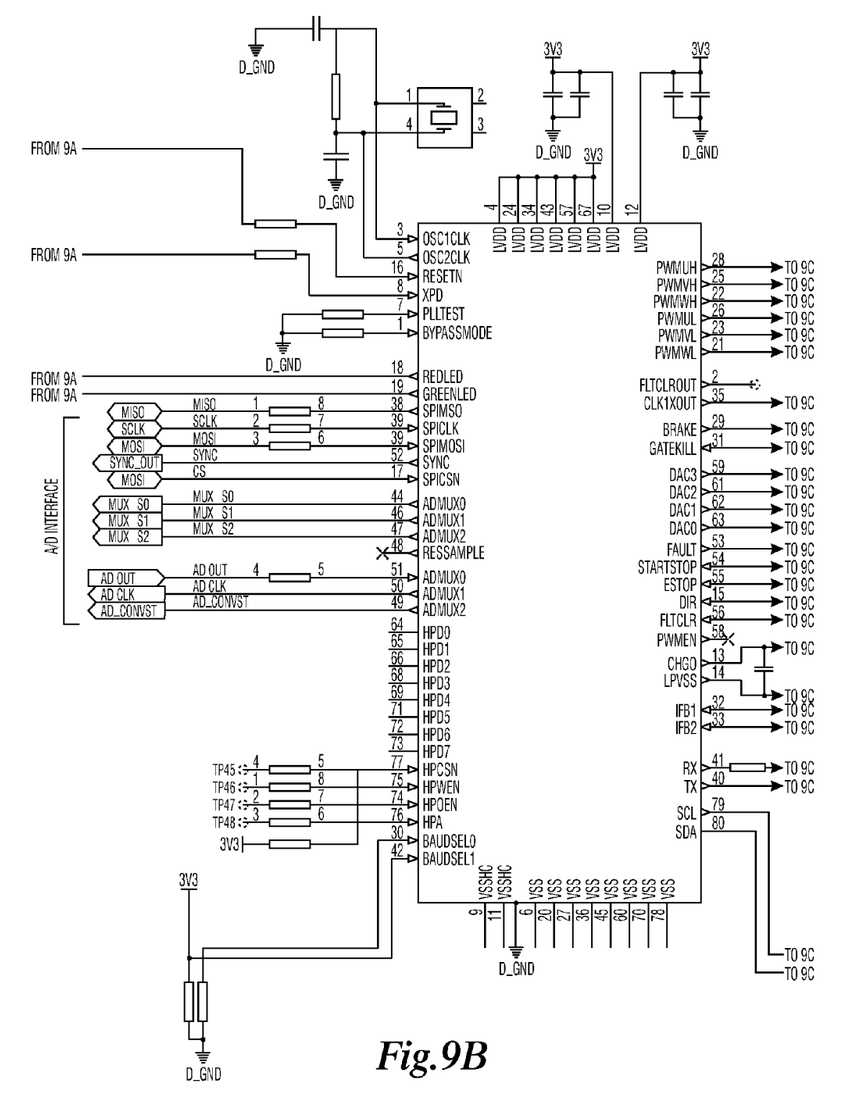
Figure 9C:
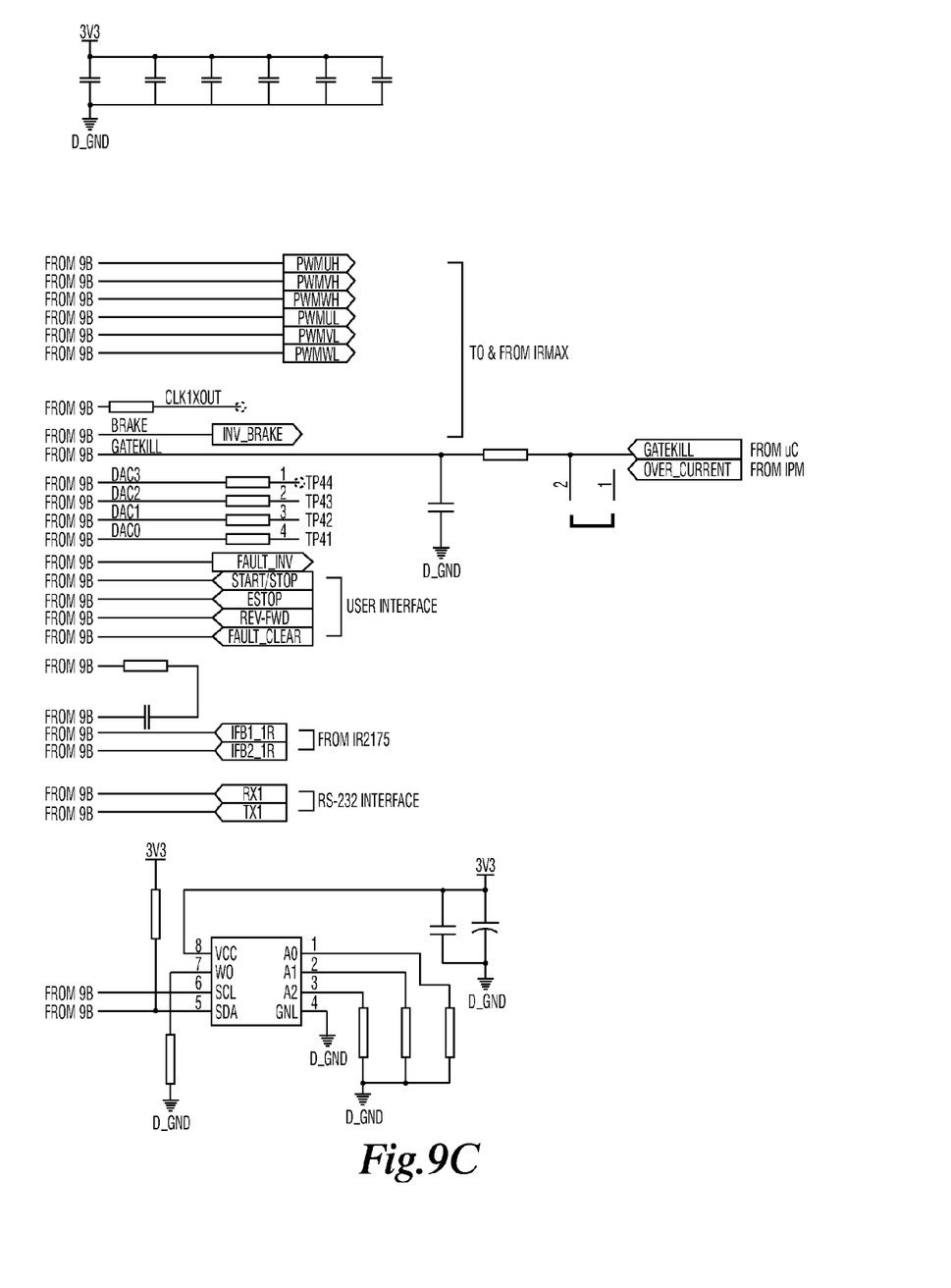
Figure 10:
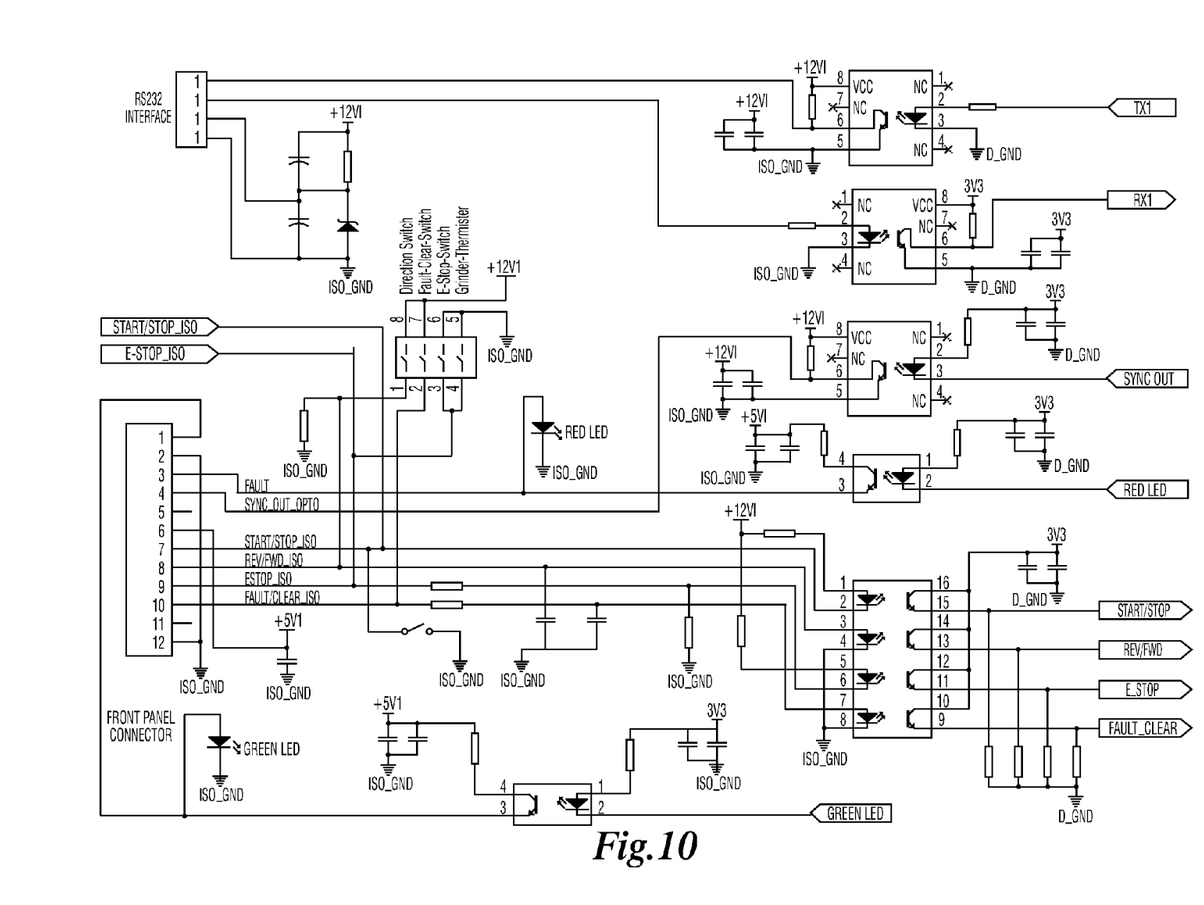
FIG. 10 is a circuit diagram of the digital interface in the preferred embodiment of FIG. 8.
Figure 11:
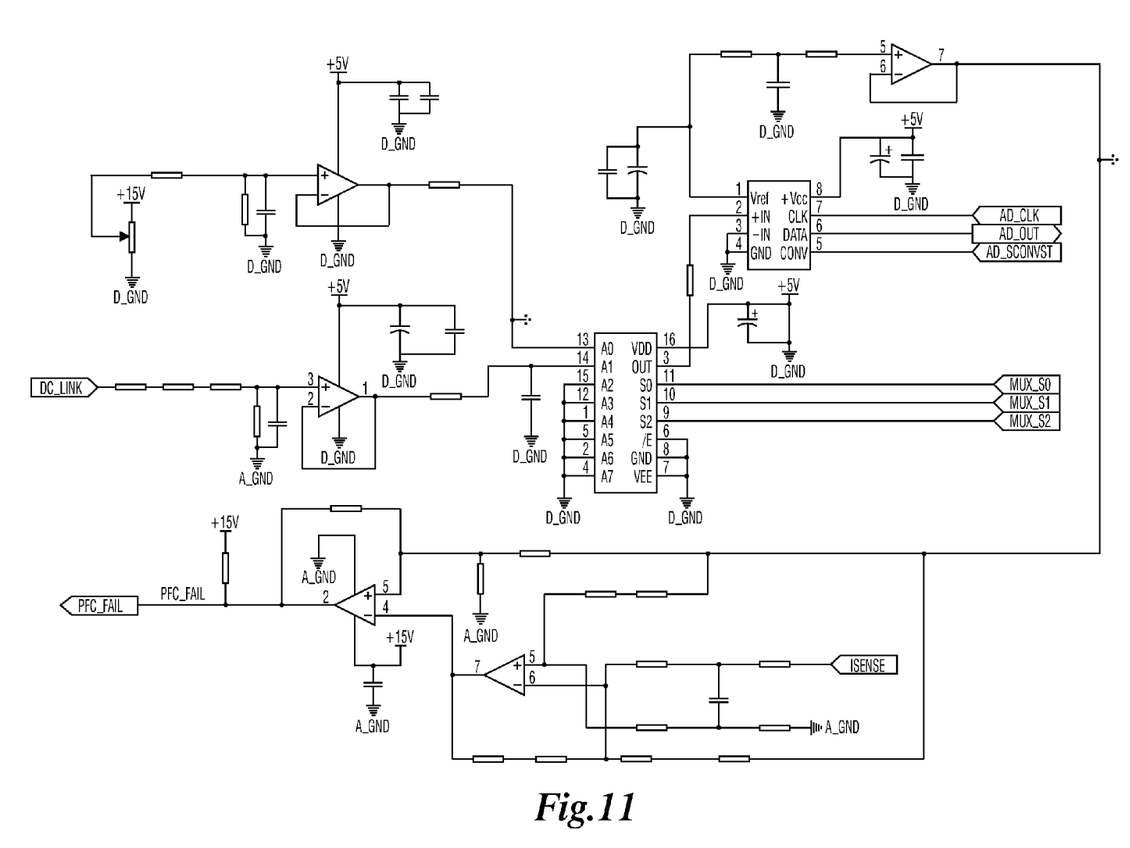
FIG. 11 is a circuit diagram of the analog interface in the preferred embodiment of FIG. 8.
Figure 12:
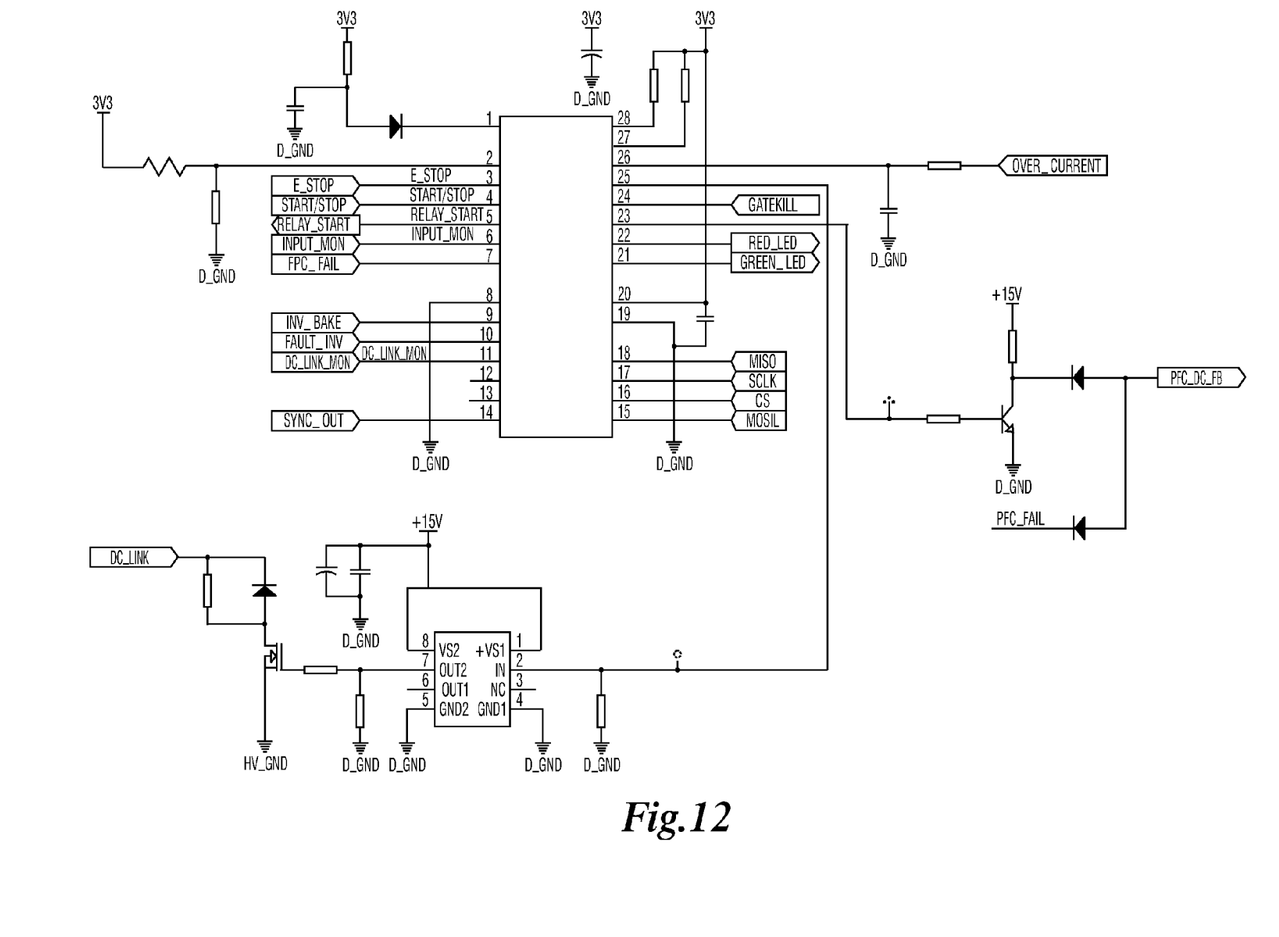
FIG. 12 is a circuit diagram of the processor circuitry in the preferred embodiment of FIG. 8.

While the IRMCK203 controller IC may have many control functions built-in, design customization in software sets the application specific control parameters and, through both power electronics hardware and the control algorithm development, the control electronics are able to achieve a maximum 30,000 rpm motor speed at 2 kW load and up to 4 kW overload capability. An exemplary microcontroller interface is illustrated in FIGS. 4-7. FIG. 4 shows all the major connections to a suitable microcontroller, such as a PIC microcontroller, either from the microcontroller chip or elsewhere in the electronics.

More specifically, the controller IC by itself is not able to quickly control starting torque and acceleration rate (or soft start) to the extent desired by the characteristics discussed in this application. When the motor is started from standing still, the starting torque and acceleration is determined by the speed demand (the required motor speed). With a high speed such as 30,000 rpm, the controller IC would normally give a huge starting torque (up to the predefined maximum) and hence high acceleration rate. This is not desirable and not consistent with the desired torque profile, including soft start. Also, it causes an over current trip. Thus, the acceleration rate setting is not functioning at the start up and only works when the motor is already running at certain speed. The control electronics use a separate microcontroller or microprocessor to implement soft start by gradually increasing the speed demand. Also, for the start up, to have as soft and smooth start as possible, unnecessary high starting torque is avoided unless there is heavy loading at the start up. This is done by software in the separate processor.

In the application of the electronics to a motor, there are several aspects as follows. The motor will have a maximum operating speed, such as about 28,800-30,000 rpm. Preferably, the speed is selectable at the time of manufacture, rather than by the user, to be set at a level less than or equal to the maximum speed. Naturally, the power output is reduced when the selected speed is below rated speed.

The speed is preferably regulated so that under steady state conditions and up to the rated continuous maximum power, the drive will run the motor to the steady-state speed within +/−10% tolerance of the set point (subject to design), up to the maximum speed limit. It is expected that the motor speed will drop below maximum speed on reaching maximum power. In dynamic speed control with 50% load change, the variation of speed, as a percentage of steady-state speed, may be limited to a maximum deviation of +/−10% for example in a transient response defined by a recovery time period and to a maximum deviation of +/−1% within 50 ms of recovery to steady-state speed. Of course, the speed regulation may be modified in light of complex control loop bandwidth and motor-drive interactions and is a trade-off between the accuracy of steady-state speed and dynamic speed control.

The torque is preferably controlled during start-up and at steady-state in accordance with the smooth torque control profile in the following table, including smooth start-up. The control electronics preferably deliver the required torque (within the limit of the power rating) at selected speed. When starting the motor, a starting torque of up to 150% of rated torque may be applied, if required. During motor acceleration, it is preferably NOT required that full torque will be available until the motor speed is over 10% of the final selected speed.

| Motor Speed | Motor Status | Available Torque | Duration* |
|---|---|---|---|
| Zero speed (parking) | Start-up | Upto 150% of rated torque | 1-2 seconds* |
| Between 0 and 10% of selected speed | Acceleration | Full rated torque may not be available | Depends on acceleration rate (soft start setting) |
| 10%-100% of selected speed | In acceleration or at steady state (running at the selected speed) | Full rated torque | Continuous |

The acceleration/soft start time (to rated speed) is preferably limited to, for example, 1.5 seconds. The deceleration time (from rated speed) is preferably limited to, for example, 5 seconds.

Due to the nature of the motor, the drive will initially align the rotor (permanent magnet) to a position to optimize the starting torque. The alignment or 'parking' phase will introduce a short delay or pause that will be apparent to the operator at the start-up. However, this starting delay/parking is preferably limited so that it does not exceed a certain time limit, such as 250 or 500 ms and alignment of, for example, 1 second. The acceleration/soft start time (to rated speed) is similarly preferably limited to, for example, 1.5 seconds and the deceleration time (from rated speed) is preferably limited to, for example, 5 seconds.

During motor braking, some load energy will feed back to the drive and a limited amount of the mechanical energy from the motor can be regenerated into the DC link upon deceleration. The braking torque may be controlled so that the braking energy will not cause the inverter DC link over voltage. Either fast or soft braking of the motor can be setup through microprocessor control discussed below. The allowable frequency of braking occurrences and start/stop duty cycle may be determined through test and assessment of braking resistor requirement. Preferably, braking torque control is set to be determined dynamically.

Also, although the controller IC provides initial motor rotor alignment algorithm (necessary for brushless PM motor), it is preferred that the alignment time be very short so that user may not notice the delay. The IC cannot work reliably if the alignment phase is set too short. Again, a unique software algorithm in a separate processor monitors the motor start-up and implements motor start-up 're-try' algorithm to ensure successful start-up. By doing this, the alignment time can be very short.

As well as the various aspects addressed above, the separate microcontroller or microprocessor can provide supervisory control—monitoring and responding to events on the input and output connections. It can monitor the input voltage, the DC bus voltage, as well as the fault registers in the microcontroller IC. Higher level control algorithms, such as output power levels, temperature controlled functionality, or cool down timers, can be programmed into the separate microcontroller or microprocessor.

Other options may include touch sensitive speed control and/or motor direction change. The touch sensitive speed control allows the user to control the speed up to a predefined maximum or maximum selectable at manufacture, by varying the amount of pressure applied to a trigger grip. The motor direction change allows the motor direction to be changed by having the microcontroller vary the state of the DIR pin on the IR chip. A high logic state can be used for one direction and a low logic state for the other direction.

The inverter circuit is a three-phase, six switch IGBT inverter. The power section of the inverter section preferably includes a unique application of an Intelligent Power Module (IPM) with specific thermal substrate and package design such as, for example, 5th generation insulated gate bipolar transistors (IGBTs) with a 600V/50A rating. A Mitsubishi $5^{th}$ generation IGBT DIM-IPM module (PS21867 or open emitter version PS21067) may be used for the IPM module, although an additional braking IGBT will be required. IR2175 devices from International Rectifier may be used to measure the current at the output line to motor (floating measurement). A very low cost switched mode power supply may provide all the on-board control power supply requirements: 3.3V, 5V, 12V, etc. and isolated supply for external thermistor, start/stop switch, RS232 interface, etc. Through the motor control algorithm, full advantage is taken of the IPM module characteristics, and the inverter achieves very compact design and high efficiency.

The control electronics may also include various user related features, such as a start/stop control, fault latching and LED indications. When receiving a 'START' signal (switch closed from the normally open position), the drive will start the motor. When a 'STOP' signal is received (switch opens), the motor will be stopped. There are preferably two levels of START/STOP interface: hardware and software. The START/STOP signal may not only feed into the on board microprocessor for software ON/OFF control, it may also be used to electronically enable/disable the inverter circuit.

When the drive is tripped as described below (due to over temperature or other faults), it should not start again. To reset the drive in the event of a fault or over-load condition arising, the drive will preferably reset only when the particular fault has cleared and the operator cycles the ON/OFF switch on the motor. LED indications are preferably provided for power on (preferably green color) and Fault (Motor Drive Fault, Over-temperature, Input Supply Failure) (preferably red color).

While the foregoing preferred embodiments of the invention have been described in some detail for purposes of clarity and understanding, it will be appreciated by one skilled in the art, from a reading of the disclosure that various changes in form and detail can be made without departing from the scope of the invention.

What is claimed is:

1. An electronic control circuit for a brushless motor, comprising:
- an input power circuit providing a DC voltage;
- a microcontroller integrated circuit receiving the DC voltage and providing three-phase control signals according to a space vector control method;
- a microprocessor connected to said microcontroller integrated circuit and executing supervisory control over the electronic control circuit; and
- an inverter circuit receiving the three-phase control signals from the microcontroller integrated circuit and providing driving signals to the brushless motor based on the three-phase control signals received from said microcontroller.

2. The electronic control circuit according to claim 1, wherein the supervisory control includes controlling the torque during start-up and at steady-state in accordance with a smooth torque control profile.

3. The electronic control circuit according to claim 1, wherein the supervisory control includes selection of the operating speed of the brushless motor.

4. The electronic control circuit according to claim 1, wherein the supervisory control includes fast or soft braking of the brushless motor.

5. The electronic control circuit according to claim 1, wherein the supervisory control includes start-up of the brushless motor.

* * * * *